(12) United States Patent
Carlsson et al.

(10) Patent No.: US 7,320,754 B2
(45) Date of Patent: *Jan. 22, 2008

(54) METHOD OF PREPARING MULTI-MODAL ANION-EXCHANGE LIGANDS

(75) Inventors: Ulrika Carlsson, Uppsala (SE); Jean-Luc Maloisel, Uppsala (SE); Nicolas Thevenin, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 322 days.

This patent is subject to a terminal disclaimer.

(21) Appl. No.: 10/547,567

(22) PCT Filed: Mar. 5, 2004

(86) PCT No.: PCT/SE2004/000317

§ 371 (c)(1),
(2), (4) Date: Aug. 29, 2005

(87) PCT Pub. No.: WO2004/078349

PCT Pub. Date: Sep. 16, 2004

(65) Prior Publication Data

US 2006/0175237 A1 Aug. 10, 2006

(30) Foreign Application Priority Data

Mar. 5, 2003 (SE) .................................. 0300625-1
Mar. 12, 2003 (SE) .................................. 0300711-9

(51) Int. Cl.
*B01D 15/08* (2006.01)

(52) U.S. Cl. .................... 210/635; 210/656; 210/198.2; 210/502.1; 502/401; 502/439; 521/32; 521/33

(58) Field of Classification Search ................ 210/635, 210/656, 659, 679, 198.2, 502.1; 502/401, 502/402, 439; 521/32, 33
See application file for complete search history.

(56) References Cited

U.S. PATENT DOCUMENTS 4,837,348 A * 6/1989 Stolowitz et al. ............... 556/9

(Continued)

FOREIGN PATENT DOCUMENTS

WO      WO 97/29825      8/1997

(Continued)

OTHER PUBLICATIONS

Feist, P., et al., "Sulfhydrylcellulose: A New Medium for Chromatography of Mercurated Polynucleotides", *Biochemistry*, vol. 20, No. 15, 1981, p. 4243-4246.

*Primary Examiner*—Ernest G. Therkorn
(74) *Attorney, Agent, or Firm*—Yonggang Ji (57) ABSTRACT

The invention relates to a method of preparing multi-modal anion-exchange ligands, which comprises providing a cyclic three-functional scaffold comprising an amine, a carbonyl and a thiol; optionally derivatisation of the amine of the scaffold to provide an anion-exchanging group and/or to protect the amine; and aminolysis to open up the derivative by adding a reagent comprising an amine coupled to a residue R in order to add said amine to the carbonyl carbon of the opened scaffold. The scaffold is advantageously homocysteine thiolactone. In one embodiment, the method comprises an additional step of immobilising the opened scaffold to a base matrix to provide a separation medium, such as a chromatography medium.

9 Claims, 3 Drawing Sheets

U.S. PATENT DOCUMENTS

| | | |
|---|---|---|
| 5,945,520 A | 8/1999 | Burton et al. .................. 536/20 |
| 7,005,071 B2 * | 2/2006 | Andersson et al. ......... 210/635 |
| 7,067,059 B2 * | 6/2006 | Maloisel et al. ............ 210/635 |
| 2004/0168983 A1 * | 9/2004 | Andersson et al. ......... 210/656 |
| 2004/0238446 A1 * | 12/2004 | Maloisel et al. ............ 210/656 |
| 2006/0027501 A1 * | 2/2006 | Andersson et al. ......... 210/656 |
| 2006/0175237 A1 * | 8/2006 | Carlsson et al. ......... 210/198.2 |
| 2006/0175258 A1 * | 8/2006 | Johansson et al. .......... 210/656 |
| 2006/0188931 A1 * | 8/2006 | Maloisel et al. ............. 435/7.1 |

FOREIGN PATENT DOCUMENTS

| | | | |
|---|---|---|---|
| WO | WO 01/38227 | * | 5/2001 |
| WO | WO 02/053288 | | 7/2002 |

* cited by examiner

METHOD OF PREPARING MULTI-MODAL ANION-EXCHANGE LIGANDS

CROSS REFERENCE TO RELATED APPLICATIONS

This application is a filing under 35 U.S.C. §371 and claims priority to international patent application number PCT/SE2004/000317 filed Mar. 5, 2004, published on Sep. 16, 2004 as WO 2004/078349 and also claims priority to patent application number 0300625-1 filed in Sweden on Mar. 5, 2003 and 0300711-9 filed in Sweden on Mar. 12, 2003; the disclosures of which are incorporated herein by reference in their entireties.

TECHNICAL FIELD

The present invention relates to a method of preparing multi-modal anion-exchange ligands and a method of preparing a separation medium by immobilising such ligands on a base matrix.

BACKGROUND

The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions (partitions) many times before the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in the order of increasing interaction with the stationary phase. The least retarded component elutes first, the most strongly retained material elutes last. Separation is obtained when one component is retarded sufficiently to prevent overlap with the zone of an adjacent solute as sample components elute from the column.

WO 9729825 (Amersham Pharmacia Biotech AB) discloses one kind of chromatography, wherein mixed mode anion exchangers provide interactions based on charges and hydrogen-bonding involving oxygen and amino nitrogen on 2-3 carbons' distance from positively charged amine nitrogen. The chromatography is based on the discovery that this kind of ligands can give anion exchangers that require relatively high ionic strengths for eluting bound substances.

More recently, a kind of ligands denoted high salt ligands was disclosed, see e.g. WO 01/38227 (Amersham Biosciences AB, Uppsala, Sweden). These ligands can act as mixed mode anion-exchange ligands, and have shown to be of great interest in many industrial applications, such as protein purification, since they can withstand high salt concentrations and accordingly does not require any substantial dilution of the sample. Thus, the high salt ligands are advantageously used for biotechnological separations, since they reduce the total volume of sample required as compared to previously described methods, and accordingly reduce the total cost for equipment as well as work effort required in such applications.

However, even though the mixed mode anion-exchange ligands reduce costs and efforts when used in separation, the hitherto described methods for the preparation thereof involves certain drawbacks that have made them less advantageous in practice. In most cases, the immobilisation of these mixed mode anion exchanger ligands is based on opening of an epoxide-derivatised gel by the amine groups of the ligand. Since this kind of nucleophilic substitutions are very dependent on the pKa of the amine group, but also of its nucleophilicity and of steric hindrance factors, no general method can be applied and optimisation of the immobilisation has to be performed for each specific case. Furthermore, in the case of amine groups with poorer nucleophilicity, a large excess (more than two equivalents) of expensive ligands were required. Another drawback is that due to the basic difference of reactivity, large differencies in the conditions of the immobilisation have to be optimised, e.g. between secondary and tertiary amines.

Another drawback of the above-mentioned WO 01/38227 is that since the immobilisation is performed via the amine function, it will not be possible to directly obtain media that contain primary amine groups.

To obtain primary amine groups, the authors of the above-mentioned WO 01/38227 have used some protective groups, which make the production longer and hence more costly, and also increase the risk to yield non-homogenous media due to incomplete deprotection.

Another solution to generate primary amines on the media is demonstrated by the use of polyamines. However, these polyamines can be attached by multiple points and again result in media with poor homogeneity.

Accordingly, none of the suggested methods are general and reliable enough to be used in the generation of libraries or in a parallel format.

A specific solution to the similar problems that are known in relation to the preparation of mixed mode cation-exchange ligands has been suggested in PCT/SE02/01650 (Amersham Pharmacia Biotech, Uppsala, Sweden), which application however was not public at the time of the filing of the present application. Disclosed is a three functional scaffold, preferably homocysteine thiolactone, which is used as a starting material for the preparation of cation-exchange ligands. The method allows generating a library of various ligands with great diversity.

Since at present there are no available functional alternatives to the method described above, there is a need within this field of improved methods for the manufacture of mixed mode anion-exchange ligands for use in separation procedures.

Finally, Feist and Danna ("Sulfhydryl cellulose: A New Medium for Chromatography of Mercurated Polynucleotides". Patricia L. Feist and Kathleen J. Danna, Biochemistry, 20(15), p. 4243-4246) have disclosed a process of preparing sulfhydryl cellulose, which process includes to mix amino ethyl cellulose with an N-acetylhomocysteine thiolactone.

SUMMARY OF THE PRESENT INVENTION

One object of the present invention is to provide a simple, general and robust method of preparing multi-modal anion-exchange ligands.

Another object of the invention is to provide multi-modal anion-exchange ligands, which are easy to immobilise to a base matrix.

Accordingly, a further object of the invention is to provide a method of preparing a separation medium, which comprises multi-modal anion-exchange ligands.

Another object of the invention is to provide a method of preparing such a separation medium, which exhibits new chromatographic properties, such as new kinds of selectivities and elution profiles.

An additional object of the invention is to provide a method to prepare immobilised multi-modal anion exchanger ligands in a reliable and controlled way without relying on large excesses of ligand.

Yet another object of the invention is to provide a method of generating a diverse library of multi-modal anion-exchange ligands based on the same scaffold, which method can be used for ligand optimisation towards a specific application.

One or more of the above-defined objects can be achieved by the present invention as defined in the appended claims. Further objects and advantages of the present invention will appear from the detailed description that follows.

DEFINITIONS

The term "separation medium" is used herein for a material useful e.g. as packing of a chromatography column, and more specifically consists of one or more ligands coupled to a base matrix. Thus, the base matrix acts as a carrier, while the ligands provide functionalities that interact with target substances in chromatography.

The term "spacer" is used for a chemical entity that distances a ligand from the base matrix.

The term "ligand" means herein a chemical entity capable of binding target substances. Such target substances may be either a compound, which it is desired to isolate or remove by chromatography, or alternatively an analytical target substance.

The terms "carrying a positive charge" and "positively charged" mean that the substance carries one or more positive charges and/or has a positive net charge.

The terms "mixed mode anion-exchange ligand" and "multi-modal anion-exchange ligand" refer to a ligand capable of providing at least two different, but co-operative, sites which interact with the substance to be bound. One of these sites gives an attractive type of charge-charge interaction between the ligand and the substance of interest. The second site typically gives electron acceptor-donor interaction and/or hydrophobic and/or hydrophilic interactions. Electron donor-acceptor interactions include interactions such as hydrogen-bonding, π-π, charge transfer, dipole-dipole, induced dipole etc.

The term "high salt" ligand refers to a ligand that is capable of binding proteins in the presence of relatively high concentrations of salt (e.g. 0.3 M NaCl) relative to a reference ion exchanger that is operated under identical conditions. This can be determined using a method of frontal analysis, as described below in the experimental part.

"Electron donor-acceptor interactions" mean that an electronegative atom with a free pair of electrons acts as a donor and bind to an electron-deficient atom that acts as an acceptor for the electron pair of the donor. (See e.g. Karger et al., An Introduction into Separation Science, John Wiley & Sons (1973) page 42.) Typical acceptor atoms/groups are electron deficient atoms or groups, such as metal ions, cyano, nitrogen in nitro etc, and include a hydrogen bound to an electronegative atom such as HO— in hydroxy and carboxy, —NH— in amides and amines, HS— in thiol etc.

By "anion exchanger" is contemplated that the substance to be removed carries a negative charge and the anion exchanger is positively charged (=anion-exchange conditions).

DETAILED DESCRIPTION OF THE INVENTION

In a first aspect, the present invention is a method of preparing at least one multi-modal anion-exchange ligand, which method comprises the steps of (a) providing at least one scaffold defined by the general formula (I) below wherein A, B and X irrespective of each other are carbon atoms or any heteroatoms, such as oxygen, sulphur, nitrogen and/or silica, m is any integer between 0 and 4, such as 1-3, preferably 1 or 2, and the functional group N is a nitrogen, which either replaces one X or is attached to any one of A, B and X;

(b) an optional derivatisation of the nitrogen of the scaffold(s) to provide an anion-exchanging group and/or to protect the amine, while retaining the cyclic structure of the scaffold; and (c) aminolysis to open up the cyclic structure of the resulting derivative by adding a reagent comprising an amine coupled to a residue R to add said amine to the carbonyl carbon of the opened scaffold.

In the most advantageous embodiment, in formula (I), A, B, and X are carbon atoms and m is 1. In a specific embodiment, the scaffold is homocysteine thiolactone. However, as the skilled person in this field will easily understand, m can alternatively be an integer above 4, such as 5-500, e.g. 10-250 or more specifically 50-100, depending on the desired size of the ligands.

In one embodiment of the present method, derivatisation of the amine is performed by acylation or sulfonylation, or by alkylation and acylation, or by alkylation and sulfonylation, and does not generate any charged groups but the secondary interaction. In this embodiment, the charged group is introduced in step (c) by aminolysis with a polyamine group.

In another embodiment, anion-exchange groups are introduced in step (b) and (c).

In one embodiment of the present method, the derivatisation of step (b) is an alkylation, a reductive amination or any other suitable reaction that results in the desired anion-exchanging group and/or protection. Thus, in a specific embodiment, step (b) is an alkylation that provides a secondary, tertiary or quaternary amine. Thus, this group can be selected to provide weak or strong anion-exchange ligands.

For example, to provide strong anion-exchange ligands, the amine groups of the scaffold are fully alkylated to generate a quaternary amine, also known as a Q group. Such quaternary ligands are advantageously used for isolation of nucleotides and/or antisense oligonucleotides, such as antisense derivatives. The alkylation agent used can be the same or different ones to provide different groups on a single nitrogen. For tertiary amines, a similar procedure is used.

In one embodiment, wherein secondary and primary amines are desired in the final multi-modal ligand, protecting groups are preferably used to avoid polymerisation. Such protection procedures are well-known to the skilled person in this field and are easily performed according to standard methods. In an alternative embodiment, the protection step is avoided by use of an excess of amine for the aminolysis of step (c). Ligands prepared according to the invention and comprising primary amine functions are advantageously used for isolation of target compounds in environments of high ionic strength, e.g. for separation of a biomolecule, such as a protein, nucleic acid or the like, from a fermentation broth.

In one embodiment, in step (b), the nitrogen is derivatised to protect the amine with a group containing the residue C(O)—R; wherein R is as defined below. If this is followed by an aminolysis to open up the cyclic structure, a reduction of the C(O) groups to $CH_2$ will subsequently result in an anion exchanger of the kind illustrated as 'Synthetic way 5' in the experimental part below.

In one embodiment of the present method, the reagent added to provide the aminolysis of step (c) comprises an amine coupled to a residue R, which R is a linear, branched, cyclic saturated, unsaturated and aromatic hydrocarbon group, which preferably comprises about 1-20, such as 1-10 carbon atoms.

More specifically, such hydrocarbon groups may carry hydroxy groups, halogens, alkoxy and aryloxy and the corresponding thio analogues, and/or amino groups. Carbon chains may at one or more positions be interrupted by amino nitrogen for certain applications, ether oxygen, thioether sulphur etc. There may also be carbonyl groups, such as in amides and ketones, and other groups having the comparable stability against hydrolysis. At most one atom selected from oxygen, sulphur and nitrogen is preferably bound to one and the same $sp^3$-hybridised carbon atom. Further, R will provide one or more electron donor or acceptor atoms or groups to enable binding of a target substance to the anion-exchanger as discussed above. R can as well contain charged groups as long as the final ligand presents a full interval window where it is globally positively charged and can function as an anion-exchanger. In an advantageous embodiment, a polyamine is desired, and then R is a group that provides one or more amines.

Since the final separation medium is useful in ion exchange mode, the residue R is used to introduce the multi-modal characteristics thereof, as desired. As the person skilled in this field will realise, in the final ligand, R may be comprised of two or more parts that are functional in binding, optionally separated by a spacer. Thus, at this level, opening with diverse amines can generate a library of multi-modal anion-exchange ligands, which are ready to be immobilised to a base matrix.

In one embodiment of the present method, steps (a) and (b) have been performed earlier to provide a ready-derivatised scaffold.

In an advantageous embodiment, the present method also comprises a step (d) of immobilising the opened product so obtained via the thiol group to a base matrix comprising a reactive group, which is optionally coupled to the base matrix via a spacer.

Thus, in a specific embodiment, the present method also comprises a step of bromination of the reactive group of the base matrix, wherein said reactive group is a carbon-carbon double bond. (For a general review of immobilisation techniques, see e.g. see e.g. Immobilized Affinity Ligand Techniques, Hermanson et al, Greg T. Hermanson, A. Krishna Mallia and Paul K. Smith, Academic Press, INC, 1992.)

In an alternative embodiment, the present method also comprises a step of activating the reactive group of the base matrix under conditions favouring radical reaction, wherein said reactive group is a carbon-carbon double bond.

In a second aspect, the present invention relates to the use of homocysteine thiolactone as a starting material in the preparation of multi-modal anion-exchange ligands. Homocysteine thiolactone is commercially available, e.g. from Aldrich, catalogue no. H1, 580-2, and CAS no. 6038-19-3.

In a third aspect, the present invention is a multi-modal anion-exchange ligand, or a separation medium comprising a plurality of multi-modal anion-exchange ligands coupled to a base matrix, which ligand or medium has been prepared by a method as defined above. Thus, in the case where the separation medium is intended for use in chromatography, the base matrix is commonly in beaded form, such as a gel, or in monolithic form. In alternative embodiments, the base matrix can e.g. be a membrane, a filter, one or more chips, surfaces, capillaries etc.

Thus, in one embodiment, the base matrix is made from a natural polymer, preferably in the form of porous beads, which are easily performed by the skilled person in this field according to standard methods, such as inverse suspension gelation (S Hjertén: Biochim Biophys Acta 79(2), 393-398 (1964) or spinning disk technique (see e.g. WO 88/07414 (Prometic Biosciences Inc)). Alternatively, natural polymer beads are obtained from commercial sources, such as Amersham Biosciences AB, Uppsala, Sweden. Illustrative tradenames of such useful natural polymer beads are e.g. of the kind known as Sepharose™ or Sephadex™.

In an alternative embodiment, the base matrix is made from a synthetic polymer, preferably in the form of porous beads, comprised of cross-linked synthetic polymers, such as styrene or styrene derivatives, divinylbenzene, acrylamides, acrylate esters, methacrylate esters, vinyl esters, vinyl amides etc. Such polymers are easily produced according to standard methods, see e.g. "Styrene based polymer supports developed by suspension polymerization" (R Arshady: Chimica e L'Industria 70(9), 70-75 (1988)). Alternatively, a commercially available product, such as Source™ (Amersham Biosciences AB, Uppsala, Sweden) can be surface-modified according to the invention.

A fourth aspect of the present invention is a kit comprising a scaffold defined by the general formula (I), as defined above, optionally a derivatisation agent, such as an alkylation agent, and one or more amines coupled to a residue R as defined above together with written instructions for the manufacture of a multi-modal anion-exchange ligand. In a specific embodiment, the present kit also comprises a base matrix, wherein the written instructions are for the manufacture of a separation medium comprising a plurality of multi-modal anion-exchange ligands. The base matrix can be any one of the above discussed.

In an advantageous embodiment, the present kit is for generating high salt ligands.

In a further aspect, the present invention relates to a chromatography column for anion chromatography, which column has been packed with a separation medium as described above. The column can be of any desired size, such as for large-scale production or labscale, or suitable for analytical purpose. The column can also be combined with separation medium and optionally suitable liquids to provide a second kind of kit, which is also encompassed by the present invention.

In addition, the present invention also encompasses a process of separating a target substance from a liquid, which process comprises to provide a separation medium as described above and to contact said medium with the liquid to adsorb the target substance thereon. The present process is preferably a chromatographic process, but in alternative embodiments, it may be a batch procedure wherein the liquid is contacted with the medium in a vessel for a suitable period of time. In an advantageous embodiment, the present process is multi-dimensional chromatography. The present process is useful to isolate any target molecules which is capable of adsorption to the herein described ligands, such as biomolecules. In this context, biomolecules are e.g. proteins, peptides, nucleic acids, such as DNA and RNA, plasmids, oligonucleotides, virus, cells etc. In a specific embodiment, the present process is a process of separating nucleotides from a liquid. In an alternative embodiment, the present process is a process of separating antisense oligonucleotides from a liquid. The general principles of chromatography for separating a target substance as discussed above are well known in this field, and the skilled person in this field can easily adopt the necessary parameters for use of the present process.

In an alternative embodiment, the present method is for identification of a target substance in a liquid, which method is suitable for analytical procedures. However, as the skilled person in this field will understand, the present invention is equally useful in the case where it is desired to remove one or more components from a liquid, such as contaminating proteins or any other undesired biomolecules.

DETAILED DESCRIPTION OF THE DRAWINGS

Figure 1:
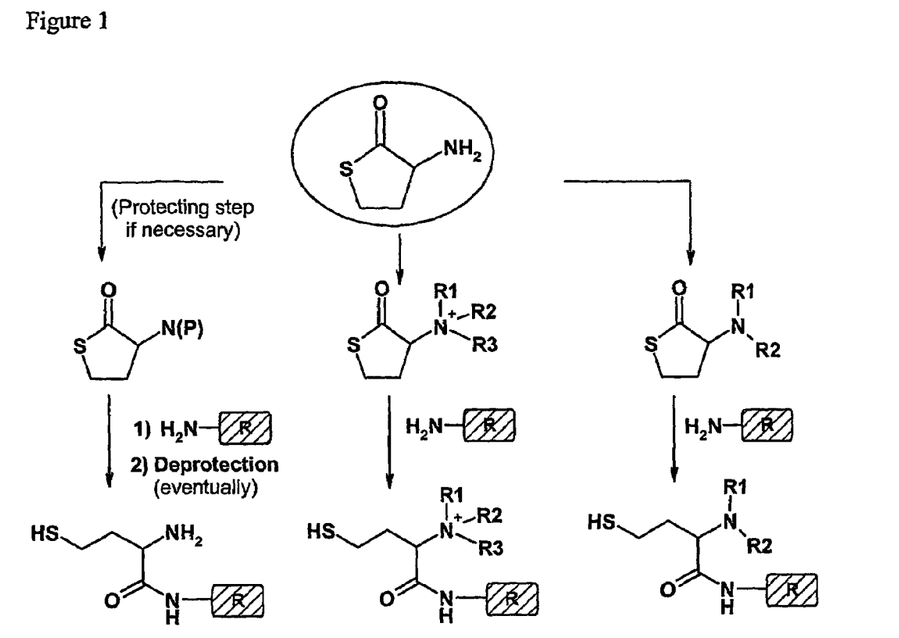
FIG. 1 is a schematic outline (Scheme 2) of a general approach to generate libraries of multi-modal anion-exchange ligands using homocysteine thiolactone as an illustrative scaffold.

FIG. 1 is a schematic outline (Scheme 2) of a general approach to generate libraries of multi-modal anion-exchange ligands according to the invention, using homocysteine thiolactone as an illustrative scaffold. The illustrative scaffold used is homocysteine thiolactone, and three different derivatised scaffolds are shown. If necessary, a protection step can be included before derivatisation. Step (c), wherein a compound comprised of an amine coupled to an R group is used to open up the cyclic structure, results in FIG. 1 in three different, illustrative ligand structures; wherein the first one is a weak anion-exchange ligand; the second is a strong anion-exchange ligand, i.e. a ligand which keeps its charge at all pH values; and the third one is a weak anion-exchange ligand.

Figure 2:
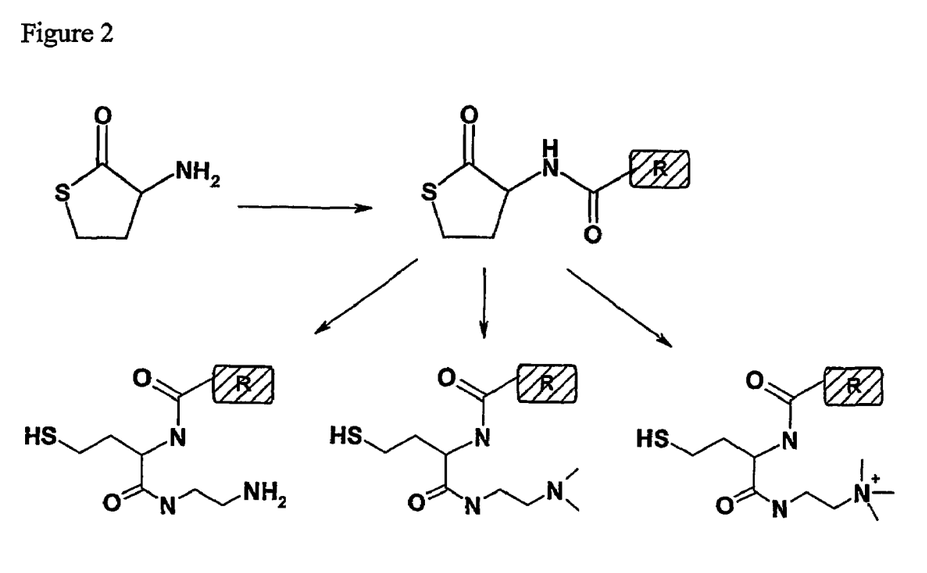
FIG. 2 is a schematic outline (Scheme 3) of an alternative approach of multi-modal anion-exchange ligands that can be prepared according to the present invention.

FIG. 2 is a schematic outline (Scheme 3) of an alternative approach of multi-modal anion-exchange ligands that can be prepared according to the present invention. Again, the illustrative scaffold used is homocysteine thiolactone. As appears from FIG. 2, weak and strong anion-exchange ligands can be prepared.

Figure 3:
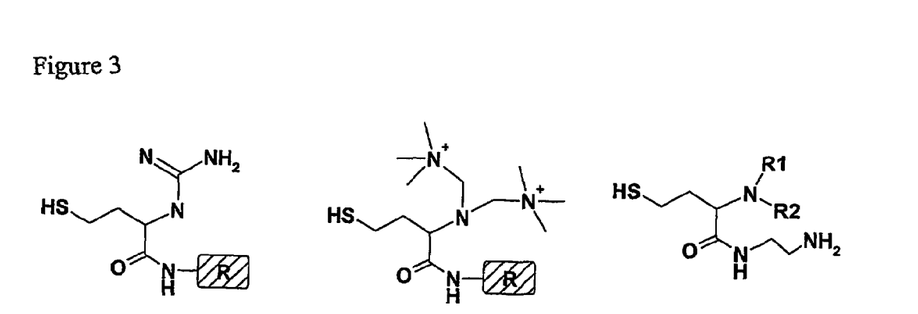
FIG. 3 shows illustrative positively charged groups and polycationic ligands that can be prepared according to the present invention.

FIG. 3 shows (Scheme 4) illustrative positively charged groups and polycationic ligands that can be prepared according to the present invention. Again, it is illustrated that weak and strong anion-exchange ligands can be prepared according to the invention.

Experimental Part

The present examples are intended for illustrative purposes only, and should not be used to limit the scope of the invention as defined in the appended claims. All references given below and elsewhere in the present specification are hereby included herein by reference.

Procedures Using D,L-homocysteine Thiolactone to Generate New Media for Anion Exchanger Chromatography:

The preparation of anion exchanger ligands can be, for example realised via the use of the homocysteine thiolactone, which can be envisaged via several strategic synthetic approaches. The anionic group of the ligand can come from the amine function of the homocysteine thiolactone, with a direct ring opening derivatisation step (synthetic way 1) or via a protection, deprotection approach (Synthetic way 2). The anionic group can also be introduced in the ring opening derivatisation step to N-protected or non-protected thiolactone (Synthetic way 3) or as well to a derivatised homocysteine thiolactone (Synthetic way 4). The anionic group can also be generated by the reduction of amide groups (Synthetic way 5). In case an N-protection/deprotection strategy is used the coupling can be performed after the deprotection or before. All coupling were performed via nucleophilic substitution or radical addition.

Scheme 1: Examples of synthetic strategy to generate anion exchanger ligands

P: N-protective group, AEx: anion exchanger group, R1, R2, R3, R: substituant

EXAMPLES

Preparation of the Ligands

Synthetic Way 1

Example 1a

Benzylamine (3.7 ml, 33.9 mmol) was added under argon at room temperature to a stirred solution of D, L-homocysteine thiolactone hydrochloride (1 g, 6.51 mmol) in THF (40 ml). After 4 hours the solution was evaporated and dried under vacuum. The residue was purified by HPLC (water/acetonitril) to give a white product (0.77 g, 52%).

Example 1b

Butylamine (1.6 ml, 16.2 mmol) was added under argon at room temperature to a stirred solution of D, L homocysteine thiolactone hydrochloride (1 g, 6.51 mmol) in THF (40 ml). After 2 hours the solution was evaporated and dried under vacuum. The residue was purified by HPLC (water/acetonitril) to give a white residue.

Example 1c 2-(trifluoromethyl)benzylamine (4.5 ml, 32.1 mmol) was added under argon at room temperature to a stirred solution of D, L homocysteine thiolactone hydrochloride (0.99 g, 6.47 mmol) in THF (40 ml). After 3 hours the solution was evaporated and dried under vacuum. The residue was purified by HPLC (water/acetonitril) to give a white solid (0.48 g, 25%).

Synthetic Way 2

Example 2a

Protection of the Amine Group of Homocysteine Thiolactone

D,L-Homocysteine thiolactone hydrochloride (7.04 g, 45.82 mmol), N-diisopropylethylamine (DIPEA, 8.40 ml, 48.22 mmol) and dichloromethane (DCM, 200 ml) were mixed under nitrogen atmosphere. The reaction was stirred for some minutes in an ice bath and then di-tert-butyl dicarbonate (10.53 g, 48.25 mmol) was added. After 20 min of stirring at 0° C. the reaction mixture was allowed to warm up to room temperature. After 20 h the solvent was removed under vacuum and flash chromatography (eluent Dichloromethane) gave a white solid (5.88 g, 59%).

Ring Opening of the Protected Homocysteine Thiolactone

The above product (933 mg, 4.29 mmol) was dissolved in 50 ml of THF degassed with argon. Thiophene-2-methylamine (2.59 g, 22.88 mmol) was then added and the reaction mixture stirred for 4 days. The solvent was evaporated and the residue extracted with ethylacetate (45 ml) washed with 10% aq. citric acid (2×15 ml), water (10 ml). After drying with $Na_2SO_4$ the organic phase was evaporated and the residue obtained directly used in the next step.

Deprotection of the Protected Homocysteine Thiolactone

Trifluoroacetic acid (5 ml) was added to a solution of the residue obtained above in 45 ml of dichloromethane (DCM) degassed with argon.

The reaction was stirred for 4 h at room temperature before evaporating the solvent. The residue was submitted to preparative (water/acetonitril) to give a white solid (0.76 g, last two steps 72%).

Synthetic Way 3

Example 3a

N,N-dimethylethylenediamine (1.77 ml, 16.26 mmol) was added under argon at room temperature to a stirred solution of D, L-homocysteine thiolactone hydrochloride (1 g, 6.51 mmol) in THF (40 ml). After 4 hours the solution was evaporated and dried under vacuum. The residue was directly used for coupling.

Synthetic Way 4

Example 4a

A solution of benzoyl chloride (0.87 ml, 7.5 mmol) in 5 ml DCM was added drop wise to a solution of D,L-homocysteine thiolactone (1.15 g, 7.5 mmol) and DIPEA (2.6 ml, 15 mmol) in dichloromethane (DCM, 15 ml) at 0° C. The mixture was stirred overnight at room temperature. The solvent was evaporated under vacuum and the reaction residue was extracted with ethyl acetate (30 ml). The organic phase was washed with aq. citric acid 10% (w/w, 20 ml), aq. $K_2CO_3$ 10% (20 ml), water (20 ml), and dried with sodium sulphate. After filtration, the solvent is removed yielding a white solid (1.37 g, 83%). N,N-dimethylethylenediamine (0.68 ml, 6.25 mmol) was added under argon at room temperature to a stirred solution of the white solid (0.55 g, 2.49 mmol) obtained above in dry THF (20 ml). After 6 hours the solution was evaporated and dried under vacuum to give a white powder which was directly used for coupling.

Coupling of the Ligands to Allylated Sepharose™ 6FF

Preparation of Gel 1a:

2.0 g of Sepharose™ 6FF having an allyl group concentration of 167 µmol/ml was washed with water (5×10 ml) and dioxan (5×10 ml) and added to a flask with 0.5 ml dioxan. Ligand 1a (292 mg, 1.3 mmol) and AIBN (2,2'-Azoisobutyronitril) (204 mg, 1.2 mmol) were dissolved 1 ml dioxan. The solution was flushed with nitrogen for 10 min, added to the gel, and the reaction flask shaken overnight at 70° C. After reaction, the gel was filtered and washed with dioxan (5×20 ml), ethanol (5×20 vol.) and water (3×20 ml). The loading of ligand on the gel was measured by titration of the amine functions using the following procedure: 1 ml of gel was washed with 0.5 M HCl solution, following by 1 mM HCl solution. The gel was transferred to a flask and 19 ml of water and 2 drops of $HNO_3$ conc. added. The titration was done using silver nitrate 0.1 M solution. Result: 85 µmol/ml of gel.

Preparation of Gel 1b:

Ligand 1b (about 3 eq. of ligand per allyl groups) was dissolved in water (3.5 ml) and the pH adjusted to 8.5 by addition of aq. 50% (w/w) NaOH. The solution was added to a bromine activated allyl Sepharose™ Fast Flow gel (2 g, 230 µmol/ml of gel) and the mixture left at 60° C. on a shake board. After 18 hours, the gel was filtered and washed with water (2×30 ml), ethanol (2×30 ml), acetic acid 0.2M (2×30 ml) and water (2×30 ml). The ionic capacity of the gel, measured by titration of the amine groups was found to be at 190 µmol/ml of gel.

Preparation of Gel 1c:

2.0 g of Sepharose™ 6FF having an allyl group concentration of 167 µmol/ml was washed with water (5×10 ml) and dioxan (5×10 ml) and added to a flask with 0.5 ml dioxan. Ligand 1c (240 mg, 0.83 mmol) and AIBN (190 mg, 1.14 mmol) were dissolved 1 ml dioxan. The solution was flushed with nitrogen for 10 min, added to the gel, and the reaction flask left on a shake board at 70° C. After 19 hours, the gel was filtered and washed with dioxan (5×20 ml), ethanol (5×20 vol.) and water (3×20 ml). The loading of ligand on the gel was measured by titration of the amine functions to be at 106 µmol/ml of gel.

Preparation of Gel 2a:

2.0 g of Sepharose™ 6FF having an allyl group concentration of 230 µmol/ml was washed with water (5×10 ml) and dioxan (5×10 ml) and added to a flask with 0.5 ml dioxan. Ligand 2a (290 mg, 1.26 mmol) and AIBN (190 mg, 1.14 mmol) were dissolved 1 ml dioxan. The solution was flushed with nitrogen for 10 min, added to the gel, and the reaction flask was left on a shake board at 70° C. After 19 hours, the gel was filtered and washed with dioxan (5×20 ml), ethanol (5×20 vol.) and water (3×20 ml). The loading of ligand on the gel was measured by titration of the amine functions to be at 142 µmol/ml of gel.

Preparation of Gel 3a:

Ligand 3a (about 3 eq. of ligand per allyl groups) was dissolved in water (3.5 ml) and the pH adjusted to 8.5 by addition of aq. 50% (w/w) NaOH. The solution was added to a bromine activated allyl Sepharose™ Fast Flow gel (2 g, 230 µmol/ml of gel) and the mixture left at 60° C. on a shake board. After 18 hours, the gel was filtered and washed with water (2×30 ml), ethanol (2×30 ml), acetic acid 0.2M (2×30 ml) and water (2×30 ml). The ionic capacity of the gel, measured by titration of the amine groups was found to be at 156 µmol/ml of gel.

Preparation of Gel 4a:

Ligand 4a (0.32 g, 1.02 mmol) was dissolved in DMSO/water: 80/20 (2.5 ml) and the pH adjusted to 9 by addition of aq. 50% (w/w) NaOH. The solution was added to a bromine activated allyl Sepharose™ Fast Flow gel (2 g, 230 µmol/ml of gel) and the mixture left at 60° C. on a shake board. After 18 hours, the gel was filtered and washed with water (2×30 ml), ethanol (2×30 ml), acetic acid 0.2M (2×30 ml) and water (2×30 ml). The ionic capacity of the gel, measured by titration of the amine groups was found to be at 133 µmol/ml of gel.

Chromatographic Evaluation of the Gel:

Experimental Reference Procedures for Ion Exchangers

Materials

Buffer Solution

Buffer 1: 20 mM piperazine+0.25 NaCl pH 6.0

Protein Solution:

BSA: 4 mg/mL in Buffer 1

All buffers and protein solutions were filtered through a 0.45 µm Millipore Millex HA filters before use.

Chromatography System

All experiments were performed at room temperature using a ÄKTA™ Explorer 100 chromatography system (Amersham Biosciences AB) equipped with a Unicorn 3.1 software. Samples were applied to the columns via a 150 mL superloop. A flow rate of 1 mL/min (ca. 300 cm/h) was used throughout. The effluents were monitored continuously by absorbance measurements at 280 nm using a 10 mm flow cell.

Elution Conductivity

Each prototypes anion-exchanger was packed in a HR5/5 column (packed bed volume=1 mL) and equilibrated with 20 column volumes of a 20 mM phosphate buffer (pH 6.8). 50 µl of a protein mixture (6 mg/ml conalbumin, 4 mg/ml Lactalbumin and 6 mg/ml Soybean trypsin inhibitor) was applied to the column and eluted with a linear gradient (20 column volumes) to 100% of the previous buffer plus 2.M NaCl. The flow rate was adjusted to 0.3 ml/min (100 cm/h).

Frontal Analysis

Each prototype anion-exchanger was packed in a HR5/5 column (packed bed volume=1 mL) and equilibrated with a buffer of appropriate pH and salt concentration. The void volume of the system was determined by applying a solution of a suitable protein to the column under non-binding conditions. The time it takes for the $A_{280}$ of the effluent to reach 10% of the $A_{280}$ of the applied protein is taken as the void volume of the system (expressed in minutes).

To a column equilibrated with buffer 1 was continuously fed (e.g. via a 150 mL super loop) the sample protein dissolved in the same equilibration buffer (see above) at a flow rate of 1 mL/min (i.e. ca. 300 cm/h). The application of the sample was continued until the $A_{280}$ of the effluent reached a level of 10% of the $A_{280}$ the sample applied to the column. On the basis of data so obtained [i.e. volume of the packed gel bed (Vc), its void volume, flow rate and concentration of the protein fed to the column], the breakthrough capacity of the packed gel at a level of 10% of the concentration of the protein applied to it ($QB_{10\%}$) can be calculated.

Breakthrough and Evaluation

The breakthrough at a level of 10% of the absorbance maximum ($Qb_{10\%}$) was calculated using the following relationship:

$$Qb_{10\%} = (T_{R10\%} - T_{RD}) \times C/V_c$$

where: $TR_{R10\%}$=retention time (min) at 10% of the absorbance maximum,

$T_{RD}$=void volume of the system (in min),

C=concentration of the feed protein (4 mg/mL) and, $V_C$=packed bed volume (mL) of the column.

Results:

In the following table are presented the elution conductivity for a mixture of proteins (Conalbumin, Lactalbumin and Soybean trypsin inhibitor) and the BSA (Q10%) capacity of gels 1a, 1b, 1c, 2a, 3a and 4a compared to Q Sepharose™ FF from Amersham Biosciences AB.

Gel 4a

| Gel | Elution conductivity (mS/cm) | | | Q10% (mg/ml) |
|---|---|---|---|---|
| | Conalbumin | Lactalbumin | STI[2] | BSA[1] |
| Gel 1a | 17.9 | 17.9 | 93.4 | 26.3 |
| Gel 1b | 18 | 18 | 59 | 15.2 |
| Gel 1c | 15.8 | ND | ND | 25.2 |
| Gel 2a | 26.1 | ND | ND | 30.9 |
| Gel 3a | 16.6 | 32 | 47.3 | 3.8 |
| Gel 4a | 18.9 | 50.3 | 86.2 | 5.8 |
| Q[3] | 12.2 | 20.3 | 29.5 | 1.1 |

[1](20 mM piperazine 0.25 M NaCl; pH 6.0),
[2]STI: Soybean trypsin inhibitor,
[3]Q: Q Sepharose ™ Fast Flow,
ND: Not determined

Gel 1a

Gel 1b

Gel 1c

Gel 2a

Gel 3a

What is claimed is:

1. A method of preparing at least one multi-modal anion-exchange ligand, which method comprises the steps of
    (a) providing at least one scaffold defined by the general formula (I) below (I)

wherein A, B and X irrespective of each other are carbon atoms or any heteroatoms, m is any integer between 0 and 4, and the functional group N is a nitrogen, which either replaces one X or is attached to any one of A, B and X;
    (b) optionally derivatizing the nitrogen of the scaffold(s) to provide an anion-exchanging group and/or to protect the amine, while retaining the cyclic structure of the scaffold; and
    (c) subjecting said scaffold to aminolysis to open up the cyclic structure of the resulting derivative by adding a reagent comprising an amine coupled to a residue R to add said amine to the carbonyl carbon of the opened scaffold.

2. The method of claim 1, wherein in formula (I), A, B, and X are carbon atoms and m is 1.

3. The method of claim 1, wherein the scaffold is homocysteine thiolactone.

4. The method of claim 1, wherein step (b) is performed and the derivatisation of is an alkylation that provides a secondary, tertiary or quaternary amine.

5. The method of claim 1, wherein the reagent added to provide the aminolysis of step (c) includes an amine coupled to a residue R, which R is selected from the group consisting of linear, branched, cyclic, saturated, unsaturated and aromatic hydrocarbon groups.

6. The method of claim 1, wherein steps (a) and (b) have been performed earlier to provide a ready-derivatised scaffold.

7. The method of claim 1, which further comprises a step (d) of immobilising the opened scaffold via the thiol group to a base matrix including a reactive group.

8. The method of claim 1, which further comprises a step of brominating the reactive group of the base matrix, wherein said reactive group is a carbon-carbon double bond.

9. The method of claim 1, which further comprises a step of activating the reactive group of the base matrix under conditions favouring radical reaction, wherein said reactive group is a carbon-carbon double bond.

* * * * *